US009393485B2

(12) United States Patent
Sullivan

(10) Patent No.: US 9,393,485 B2
(45) Date of Patent: Jul. 19, 2016

(54) TRANSMISSION AND RETRIEVAL OF REAL-TIME SCOREKEEPING

(71) Applicant: Edward Matthew Sullivan, New York, NY (US)

(72) Inventor: Edward Matthew Sullivan, New York, NY (US)

(73) Assignee: GameChanger Media, Inc., New York City, NY (US)

( * ) Notice: Subject to any disclaimer, the term of this patent is extended or adjusted under 35 U.S.C. 154(b) by 0 days.

(21) Appl. No.: 14/281,493

(22) Filed: May 19, 2014

(65) Prior Publication Data

US 2014/0288683 A1 Sep. 25, 2014

Related U.S. Application Data

(63) Continuation-in-part of application No. 12/455,474, filed on Jun. 2, 2009, now Pat. No. 8,731,458.

(60) Provisional application No. 61/130,683, filed on Jun. 2, 2008, provisional application No. 61/205,104, filed on Jan. 15, 2009.

(51) Int. Cl.
| | |
|---|---|
| *A63F 13/00* | (2014.01) |
| *A63F 11/00* | (2006.01) |
| *H04N 21/2187* | (2011.01) |
| *H04N 21/414* | (2011.01) |
| *H04N 21/81* | (2011.01) |
| *G10L 15/26* | (2006.01) |

(52) U.S. Cl.
CPC ........ *A63F 11/0051* (2013.01); *H04N 21/2187* (2013.01); *H04N 21/41407* (2013.01); *H04N 21/8126* (2013.01); *A63F 2011/0058* (2013.01); *G10L 15/26* (2013.01)

(58) Field of Classification Search
CPC ... A63F 2300/61; A63F 13/216; A63F 13/31; A63F 13/42; A63F 13/525; A63F 13/5258; A63F 13/798; A63F 13/812; A63F 13/828
USPC .......................... 463/4, 30, 31, 33; 700/91, 92
See application file for complete search history.

(56) References Cited

U.S. PATENT DOCUMENTS

| | | | | |
|---|---|---|---|---|
| 6,041,266 | A   * | 3/2000  | Nickerson ........................ | 700/92 |
| 6,148,242 | A   * | 11/2000 | Descalzi et al. ................ | 700/90 |
| 6,725,107 | B2 * | 4/2004  | MacPherson ................... | 700/92 |
| 7,037,198 | B2 * | 5/2006  | Hameen-Anttila ............. | 463/41 |
| 7,457,583 | B2   | 11/2008 | Katayama | |
| 7,620,466 | B2 * | 11/2009 | Neale et al. ..................... | 700/91 |
| 7,668,726 | B2   | 2/2010  | Cardno et al. | |
| 7,733,808 | B2   | 6/2010  | Hu et al. | |
| 7,855,638 | B2   | 12/2010 | Huston | |

(Continued)

*Primary Examiner* — James S McClellan
(74) *Attorney, Agent, or Firm* — McDonald Hopkins LLC

(57) ABSTRACT

A system and method for tracking and scoring an amateur sporting event is allows spectators of amateur sporting events to record game data on a mobile electronic device and share live game updates with other amateur sports fans. The system includes a software application configured to operate on a mobile electronic device. Game data may be input into the software application and uploaded to a remote database by way of a wireless network. The remote database may allow third party users to access the game data as it is uploaded to the database in order to follow the progress of the game in real time. The software may include a graphical display that provides a visual illustration of the sporting venue and adjusts in response to scoring data entered into the software. The software may further be configured to receive scouting data related to players in the sporting event.

20 Claims, 16 Drawing Sheets

(56) References Cited

U.S. PATENT DOCUMENTS

| | | |
|---|---|---|
| 8,224,178 B2 | 7/2012 | Keane et al. |
| 8,855,469 B2 | 10/2014 | Maharajh et al. |
| 2002/0015060 A1* | 2/2002 | Honjas ............................ 345/748 |
| 2002/0019677 A1 | 2/2002 | Lee |
| 2002/0091723 A1 | 7/2002 | Traner et al. |
| 2002/0198866 A1* | 12/2002 | Kraft et al. ......................... 707/3 |
| 2003/0234787 A1* | 12/2003 | Hines et al. ..................... 345/440 |
| 2004/0064352 A1* | 4/2004 | Gordon et al. ...................... 705/8 |
| 2006/0041675 A1* | 2/2006 | Sturrock et al. ............... 709/231 |
| 2006/0167971 A1* | 7/2006 | Breiner ........................... 709/202 |
| 2009/0113505 A1* | 4/2009 | Yu ................................... 725/114 |
| 2010/0031162 A1* | 2/2010 | Wiser et al. .................... 715/747 |

* cited by examiner

FIG. 16

TRANSMISSION AND RETRIEVAL OF REAL-TIME SCOREKEEPING

CROSS-REFERENCE TO RELATED APPLICATIONS

This non-provisional patent application is a continuation-in-part application of U.S. patent application Ser. No. 12/455,474 titled "TRANSMISSION AND RETRIEVAL OF REAL-TIME SCOREKEEPING FOR AMATEUR SPORTS," and filed on Jun. 2, 2009, which claims the benefit of U.S. Provisional Patent Application No. 61/130,683, entitled "TRANSMISSION AND RETRIEVAL OF REAL-TIME SCOREKEEPING FOR AMATEUR SPORTS," filed Jun. 2, 2008, and U.S. Provisional Patent Application No. 61/205,104, entitled "TRANSMISSION AND RETRIEVAL OF REAL-TIME SCOREKEEPING FOR AMATEUR SPORTS," filed Jan. 15, 2009, both of which are hereby incorporated in their entirety.

FIELD OF THE INVENTION

The present invention generally relates to systems and methods for recording and tracking data and results related to amateur sporting events.

BACKGROUND OF THE INVENTION

Many sports fans enjoy following the live action of a sporting event as it takes place. Fans often attend live sporting events to witness the action in person, or follow a game of interest on a live television or radio broadcast. However, in some instances, fans are unable to either attend a sporting event or follow the game on television or radio. Therefore, various utilities have been developed to provide sports fans with alternative means for tracking live sporting events. For example, internet utilities such as Game Cast allow fans to track game data and statistics over the internet as a game progresses. These internet programs and utilities rely on statistics and data submitted from persons attending the game. Typically, a person at the sporting event may enter game data into a personal computer or other computing device with internet capabilities. The computer or computing device may connect to the internet using internet service provided by the sporting venue. Stats and game data input into the computing device may then be uploaded to the internet and streamed directly to internet users.

Unlike professional sports, amateur sporting events are rarely broadcast on television or radio. Sporting events such as youth sports games, school-sponsored sporting events, amateur adult sports leagues, college sports, and other recreation sporting events are often attended only by friends and relatives of the players. Scoring for such games is often kept by pencil and paper and recorded by a league official when the game is complete. Therefore, fans of amateur sports that are unable to attend a scheduled event are often unable to follow live game action. Moreover, other interested parties such as local and national media outlets that do not have sufficient resources to cover amateur sporting events are often unable collect game information for distribution to news websites or newspapers.

Friends and relatives of persons competing in amateur sports would likely welcome live game updates. For example, parents of children playing in a youth baseball game may appreciate live internet or text message updates for games that they are unable to attend. Additionally, fans attending an amateur sporting event may enjoy greater access to details about the sporting event, such as live statistical data and game information. However, unlike professional sports venues, amateur sporting venues typically do not provide internet access to allow computing devices to connect to the internet.

Further, the process of keeping stats in real-time at an athletic event is challenging. The difficulty results from the number of potential outcomes of a play and the speed at which each play happens. Recording comprehensive data for every play can be tedious and difficult. For example in recording a play in basketball, a scorekeeper must capture the name and/or uniform number of the shooter, the location of a shot, the result of the shot, the name and/or uniform number of the rebounder (on a missed shot), etc. In recording a play in baseball and softball the scorekeeper must capture the name or uniform number of the pitcher, the type of pitch (fastball, curveball, etc.) the location of the batted ball, the name or uniform number of the fielder, the success of the fielder (error or no error), and the advancement of the batter to a particular base. The aforementioned examples don't even mention other details like (in basketball) assists, turnovers and fouls or (in baseball and softball), double plays, fielder's choice, and countless other unique rules and events.

Therefore, there is a need in the art for a new interface to improve the availability of live amateur sports data.

SUMMARY OF INVENTION

A system and method for transmitting and accessing real-time amateur sports data is provided. The system includes a software application configured to operate on a mobile electronic device. The mobile electronic device may be capable of communicating with a wireless phone and data network. The software application is configured to collect and receive live game data related to a sporting event and uploaded the game data to a remote database. The system may include a website to allow third parties to access live game data and receive live streaming play-by-play and scoring updates. The system may further provide text message and email updates to third party users. The software application may include a graphical display that provides a visual illustration of the sporting venue and adjusts in response to scoring data entered into the software. The software application may further be configured to receive scouting data related to players in the sporting event.

In an embodiment, the software application includes a series of menus to assist a user with inputting game data. A user may input game data by selecting the appropriate option from a menu. The software application may further include a graphical illustration of the sporting venue or field. Portions of the graphical illustration may reflect changes in game, based upon game data entered into the mobile electronic device.

DESCRIPTION OF THE DRAWINGS

In the accompanying drawings, which are incorporated in and constitute a part of this specification, embodiments of the invention are illustrated, which, together with a general description of the invention given above and the detailed description given below, serve to illustrate the principles of this invention. The drawings and detailed description are not intended to and do not limit the scope of the invention or the claims in any way. Instead, the drawings and detailed description only describe embodiments of the invention, and other embodiments of the invention not described are encompassed by the claims.

FIG. 16 illustrates user configured alerts.

DETAILED DESCRIPTION

The Detailed Description of the Invention merely describes preferred embodiments of the invention and is not intended to limit the scope of the claims in any way. Indeed, the invention as described by the claims is broader than and unlimited by the preferred embodiments, and the terms in the claims have their full ordinary meaning.

A system and method for transferring and distributing live amateur sports data is provided. The game tracking system 10 is designed to accommodate a mobile electronic device 12 and streamline the way information is shared among followers of amateur sports, such as coaches, players, and friends and relatives of players. While the game tracking system 10 is described herein as tracking baseball games and other sports, it will be appreciated that the game tracking system 10 may be used in conjunction with any sport or sporting event.

Figure 1:
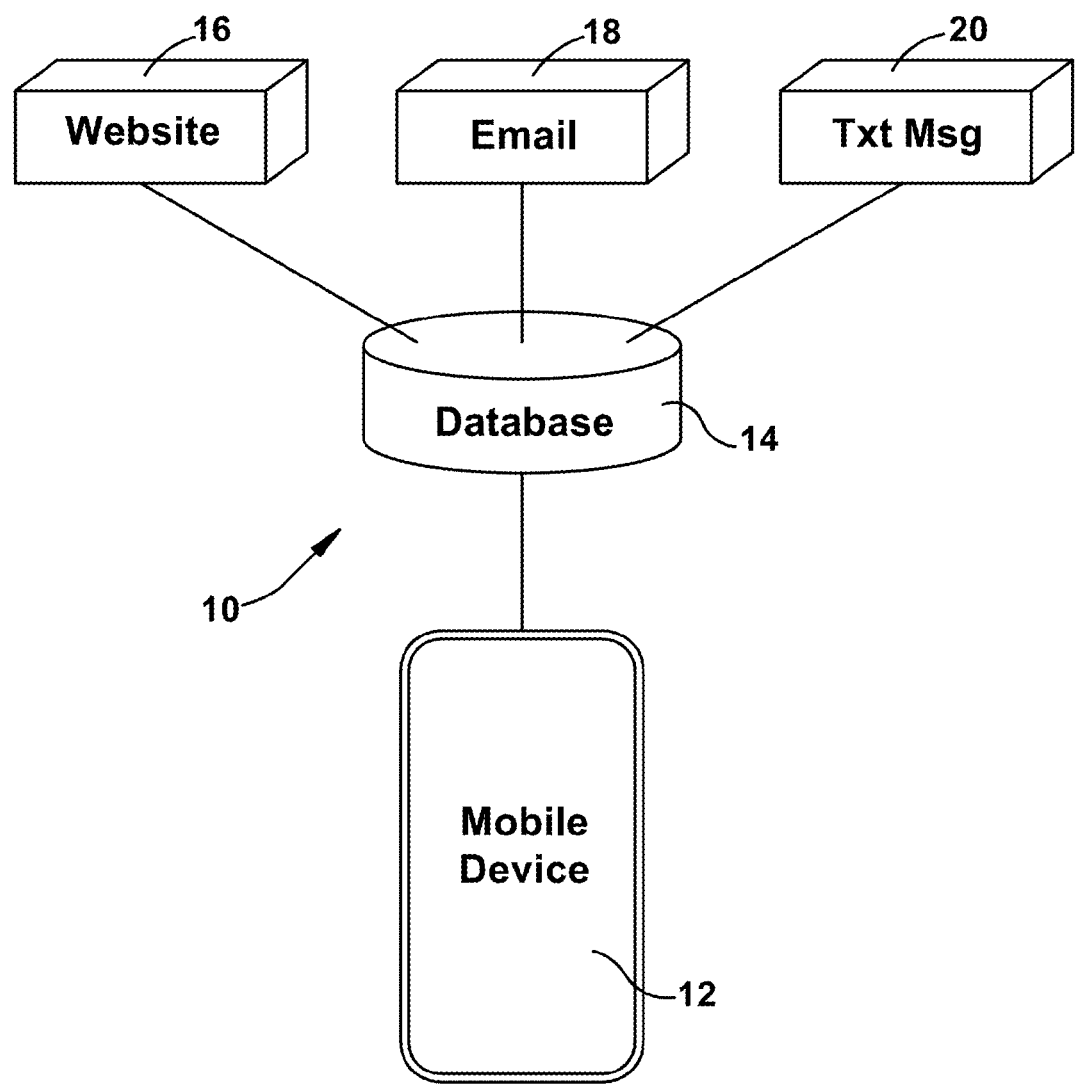
FIG. 1 illustrates a system diagram of a game tracking system.

With reference to FIG. 1, the game tracking system 10 generally includes a software application configured to run on a mobile device 12. The mobile device 12 may include a memory or data storage capable of storing and running the software application. The software application may be configured for keeping score of a sporting event. To that end, the software application may collect and receive data related to a sporting event, such as a live amateur sporting event, and distribute the data for public viewing. Data and statistics related to the sporting event ("game data") may be input into the mobile device 12 by a user at the sporting event. Game data may include, without limitation, numeric data, alphanumeric data, photographic or video data, sound data, other types of digital data, or any data or information related to the sporting event. The game data may be uploaded from the mobile device 12 to a remote database 14, such as an internet server. The database 14 may distribute the game data to make it publicly accessible.

The mobile device 12 may be a portable device configured to communicate with a remote wireless network. The mobile device 12 may include a visual display and a plurality of input devices, such as a keyboard or key pad, touch pad, track ball, microphone, or other buttons or input devices. In an embodiment, the software application may be specifically configured to run on a handheld mobile device 12 other than a laptop or computer. For example, the software application may be configured to run on a wireless handheld device such as a cellular phone, personal digital assistant (PDA), or other handheld device. Preferably, the mobile device 12 will be capable of communicating with a cellular phone and data network. The mobile device 12 may further be small and easily portable, without power chords or other connected cables.

The mobile device 12 may communicate either directly or indirectly with the remote database 14. For example, the mobile device 12 may interface with a wireless network, such as a Wi-Fi network or cellular phone and data network, to send and receive information to and from the a remote database 14 or internet server. The database 14 may prompt the mobile device 12 to enter specific information based on predetermined conditions. Further, the database 14 may allow third party users to track the action of a sporting event by accessing and monitoring the game data received from the mobile device 12 in real time.

The database 14 may store information related to specific amateur sporting events. For example, the database 14 may store rules, regulations and other information related to specific sports leagues, such as a high school baseball league or a recreation soccer league. A mobile device user may upload game information to the database 14, such as the specific league and game for which game data is being recorded. In response, the database 14 may download the corresponding rules and regulations for the specified game to the mobile device 12. The rules and regulations may include metadata and commands to alter how game data is recorded into the mobile device 12 during the game.

The software application may prompt a user to input specific data related to the sporting event being reported. For example, a user entering game data for a baseball game may be prompted to enter information such as player lineups, player statistics such as batting average, or play-by-play information such as pitch counts, balls and strikes, and results from each batter. A user entering game data for a tennis match may be prompted to enter the result of each point played as well as set a game scores. However, the software application may be configured to automatically track and determine game scores and other statistics based upon game data entered by the user.

The software application may further allow a user to input and upload graphical data, such as photographs or videos taken at the sporting event. Photo and video data uploaded by a user may allow third party users to witness game action from amateur sporting events that are not otherwise broadcast. For example, a father that is unable to attend his son's high school baseball game may view uploaded photos of his son crossing home plate to score the winning run. Likewise, video and photo game highlights may be uploaded and viewed by fans, relatives, and coaches. These highlights provide access to photos and videos that are otherwise unavailable for amateur sporting events.

The software application may allow users to input voice or sound data into the mobile device 12 and upload the data to the database 14. Users may input exciting comments related to the game, such as narrating or describing live game action. The voice and sound data may be uploaded to the database 14 to provide a live play by play narration of an amateur sporting event. The excitement in the narrator's voice may enhance the description of game action, much like the announcers at professional sporting events. The software application may further allow users to input statistical data through voice input. For example, the mobile device 12 may include voice and speech recognition capabilities to allow the software application to receive and record game data input by the user's voice. While the mobile device 12 and software application are described as tracking game statistics, photos, and video, and sound clips, it will be appreciated that any information related to the live sporting event may be input into the mobile device 12 and uploaded to the database 14.

Figure 2:
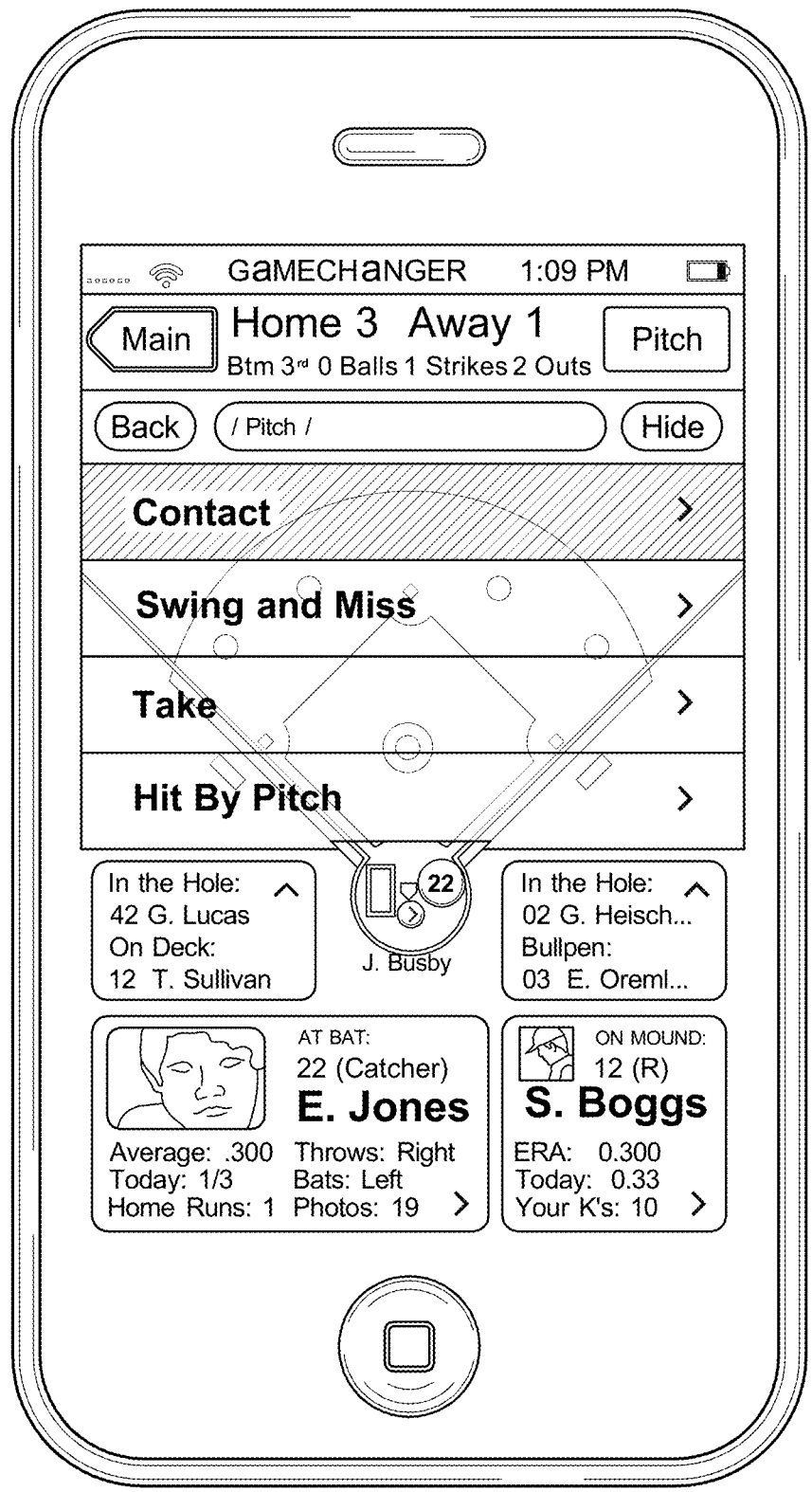
FIG. 2 illustrates a pitch result menu for a baseball game software application.
Figure 3:
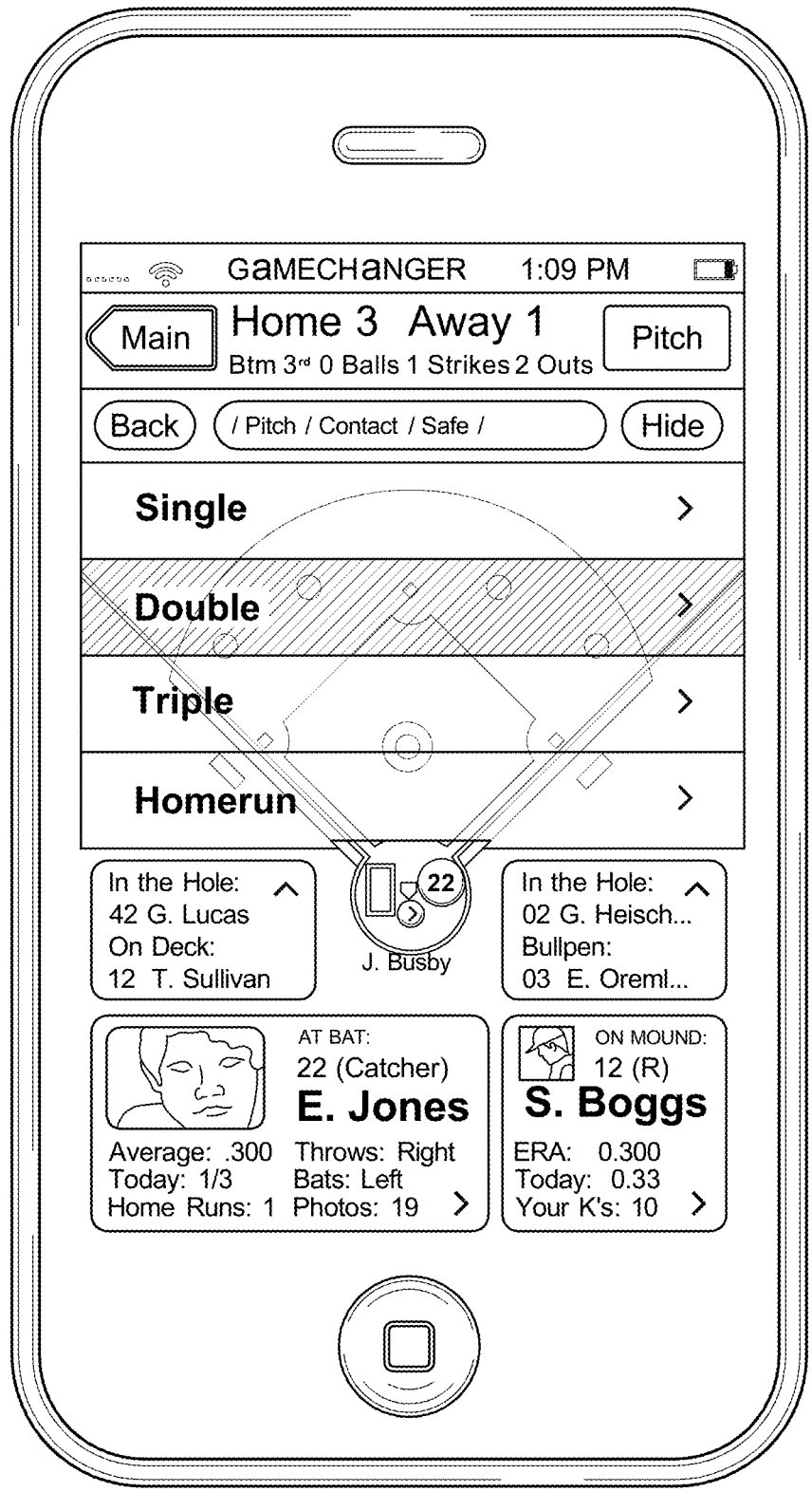
FIG. 3 illustrates an at bat result menu for a baseball game software application.
Figure 4:
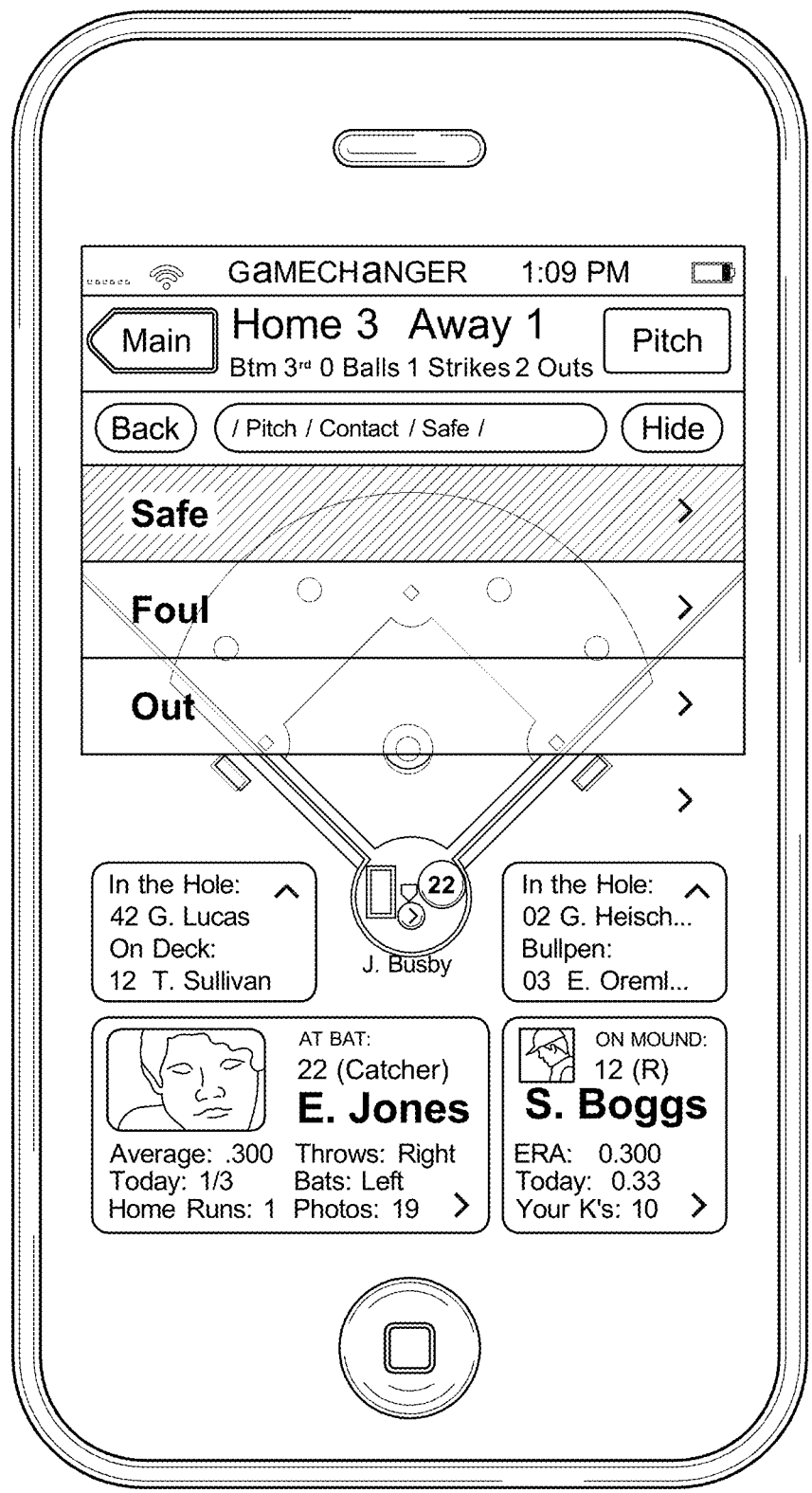
FIG. 4 illustrates a play result menu for a baseball game software application.

The software application may include a series of menus and automated features to assist users with inputting game data. The menus may correspond to the specific game data for the game being recorded. Further, the menus may be configured to correspond to the sport being recorded, based on metadata received from the database 14. Users may enter game data by selecting a choice from the menu. For example, as illustrated in FIGS. 2-4, a baseball game application may include a series of menus to input the results of each play. As shown in FIG. 2, a pitch result menu may include options for "contact," "swing and miss," "take," or "hit by pitch." For each pitch thrown to a batter, the user may select the appropriate result from the menu. The software application may further include menus to record the results of a play, as shown in FIGS. 3 and 4. While the software application is described as utilizing menus to receive game data, it will be appreciated that users may also enter the game data manually, using a keypad or any other input options available on the mobile device 12.

The software application may provide automated data entry features to enhance inputted game data and assist the user with data entry. For example, the software application may track statistics such as game score, player statistics, and other game information based upon inputted game data. The software application may further offer features such as smart sentence and word completion to assist a user with text entry. The software application may include a radio button to allow a user to input voice and sound data. Sound data may be input independently or associated with other game data, such as a narration or commentary on a specific game play.

In an embodiment, the mobile device 12 includes a touch screen interface. The touch screen acts simultaneously as a display and an input device. A user may input game data by interfacing with menus or other graphical representations using the touch screen. For example, a user may select items from a menu by taping the desired menu option. Further, a user may drop and drag items on the display to input game data such as player rosters, locations of players on the field, or places where game action is taking place.

Figure 5:
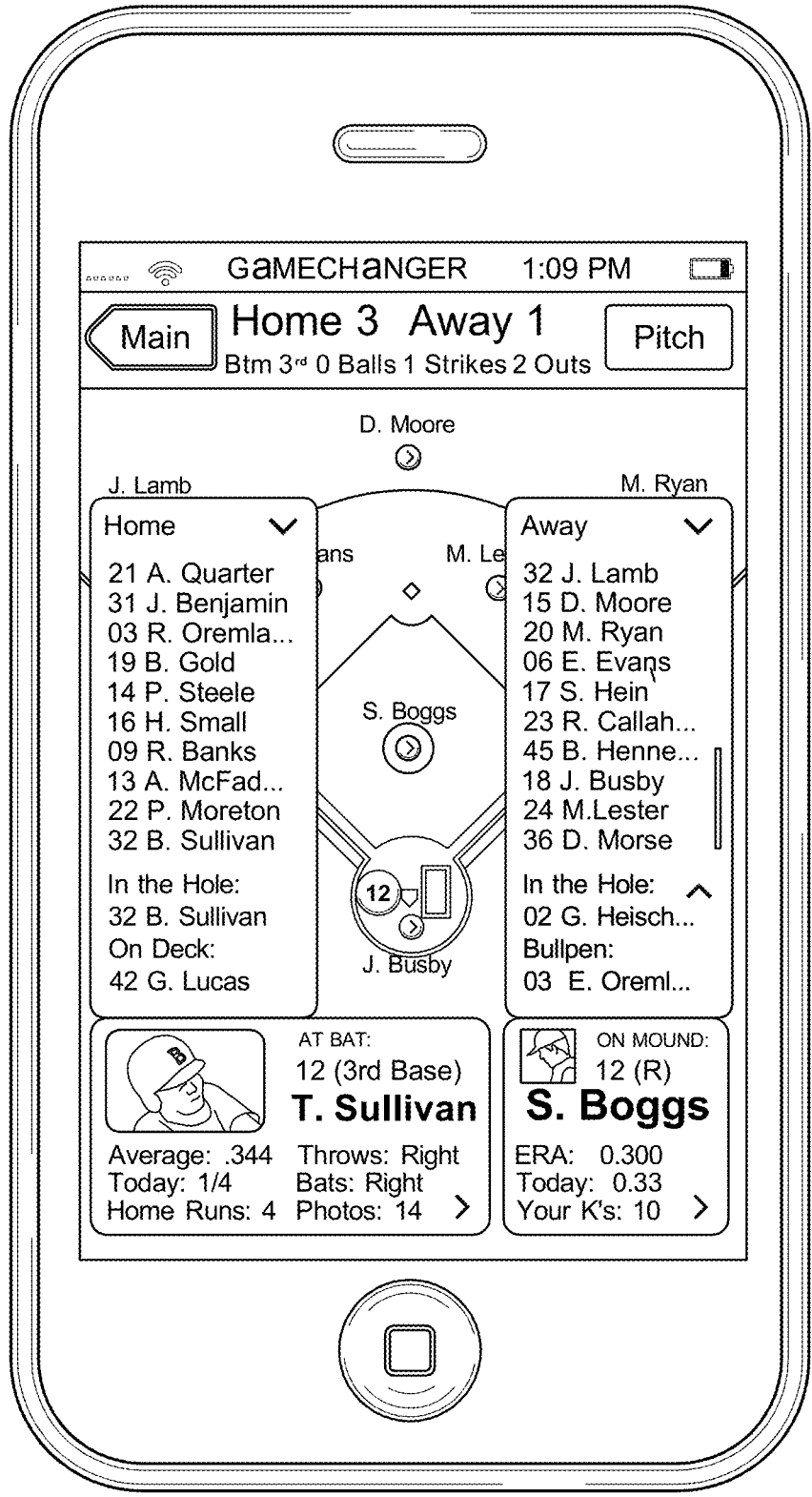
FIG. 5 illustrates a software application on a mobile device having a graphical illustration with pull down menus.
Figure 6:
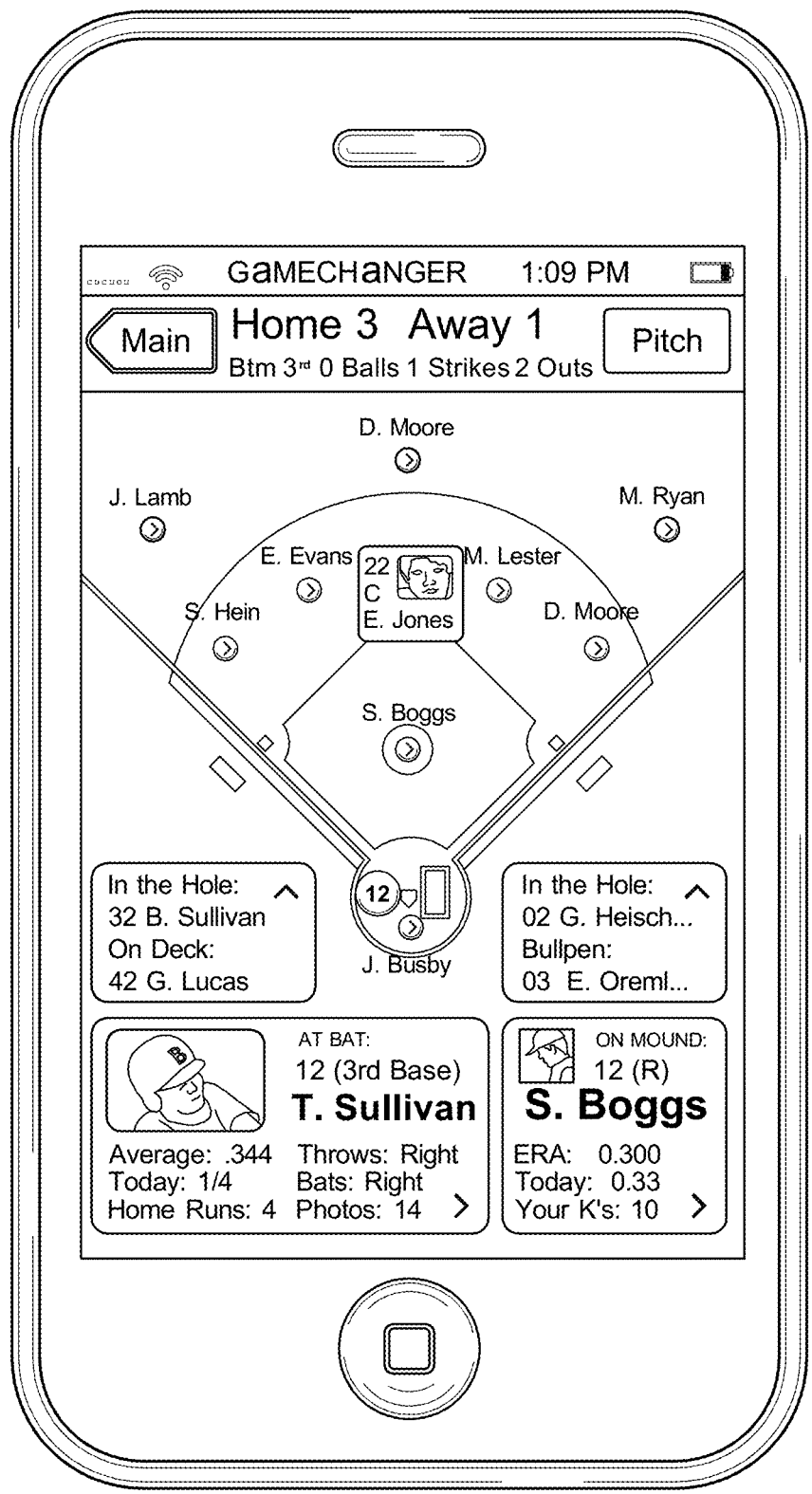
FIG. 6 illustrates a software application on a mobile device having a graphical illustration of a baseball field.

The software application may include a graphical illustration of the field or sports venue. For example, as illustrated in FIG. 5, the mobile device 12 may display a baseball field for inputting baseball related game data. The graphical illustration of the field may reflect changes in game data input into the mobile device 12. For example, as shown in FIG. 6, a software application for a baseball game may display an icon near a base where a player is located. When the player advances to the next base, the icon may move to the corresponding base on the graphical illustration of the field. For mobile devices 12 having a touch screen, the graphical illustration may be updated by touching the player to be moved and dragging them to the next location, such as the appropriate base. The touch screen may further be used to illustrate the location of a ball hit into the field, or other specific points of interest on the field. While the software application is described and illustrated as configured to score a baseball game, it will be appreciated that the software application is not limited thereto and may be configured to score a basketball, football, soccer, or hockey game, or any other sporting event.

Once game data has been input into the mobile device 12, the software application may upload the game data to the database 14 to allow the game data to be accessed at access points by third party users. The software application may establish a continuous connection with the wireless network in order to continuously upload game data and provide the database 14 with live game data updates. Additionally, scheduled updates may be sent from the mobile device 12 to the database. For example, the software application may be configured to upload game data updates at predetermined time intervals. The software application may also be configured to upload game data updates at predetermined points during the games, such as between inning of a baseball game, between quarters or halves of a football, basketball or soccer game, or between sets or games of a tennis match.

The database 14 may allow third party users to access game data and receive live game updates from a plurality of access points. For example, the database 14 may allow an internet website 16 to access game data. Specifically, third party users may view live box scores and game data updates on the website 16 as they are uploaded to the database 14 from the mobile device 12. The website 16 may include a graphical representation of the field or sports venue, similar to the graphical representation on the mobile device 12. The graphical representation may be updated to reflect changes in the game and live play-by-play game action as the game progresses. The website may further display photos from the sporting event taken on the mobile device 12 and uploaded to the database 14.

The website 16 may also provide third party users with additional options for accessing game data. For example, third party users may receive live or scheduled game updates by way of an email 18 or text message 20 to an email address or cell phone. Specifically, a third party user may enter the appropriate information into the website 16, such as email or cell phone number, and request game updates for a specific game. Game updates may be sent to the user as they are received by the database 16, or alternatively on a predetermined schedule such as every hour or half hour.

The database 14 may further provide third party users with voice mail game updates. For example, the database 14 may include a voice mailbox that may be accessed by third party users to hear game data updates. The database 14 may also serve as a cloud or grid network to interface with access points such as the website 16 and third party mobile devices. Specifically, the database 14 may push data to the access points when live updates or new game data is available for public access. This allows third party users to stay informed of live game updates without needing to constantly request updated information.

The website 16 may further record and archive game summaries based on game data submitted during the game. The game summaries may include game statistics, game photos, injury reports, team records, sound, photographic and video data, and other game information. The website 16 may allow third party users to view archived game summaries or receive game summaries via cell phone text or email.

The website 16 may allow third party users to interface with a mobile device user during a game. For example, the website 16 may allow third party users to send text requests to the mobile device user related to the status of the game or players in the game. The software application may display the text requests and allow the mobile device user to respond accordingly. The website 16 may further allow third party users to supplement game data with statistics and other historical data related to the game being recorded and the teams and players involved in the game.

The game tracking system 10 may include means to rate and regulate the accuracy of game data contributed by mobile device users. The website 16 may allow third party users to rate the accuracy of game data contributed by a mobile device user. Specifically, third party users with firsthand knowledge of results of a specific game may access the website 16 and view game summaries from the corresponding game. The third party users may then verify the accuracy of the submitted game data by giving the game data a positive rating or leaving positive comments. Alternatively, if the game data in the summary is inaccurate, third party users may leave a negative rating negative comments regarding the inaccuracies.

Figure 7:
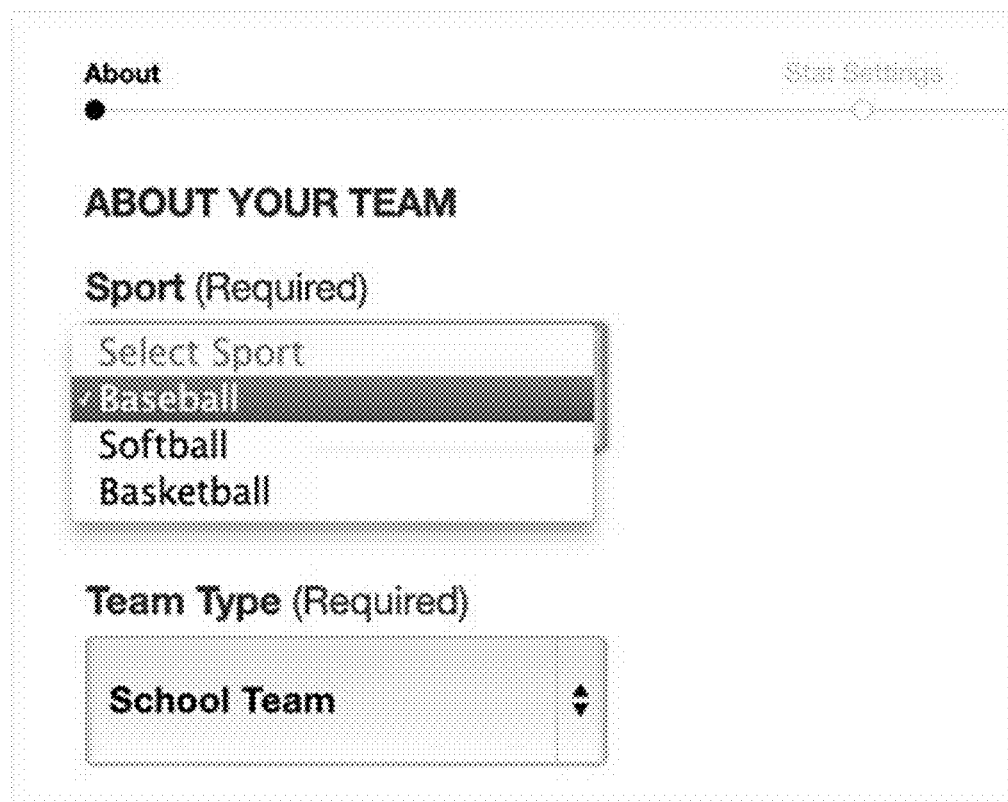
FIG. 7 illustrates a pull down menus for entering in team data.

In an embodiment, the game tracking system 10 may be configured to allow a user to enter and configure a new team to be tracked by the database 14, website 16, and mobile device 12 application. For example, the website 16 or software application may allow a user to create a data record for a new sports team, such as a new baseball team or basketball team. The team record may be associated with appropriate data, such as the sport, the type of team (school, rec, etc), a team name, location, and other similar data. In an embodiment, this team information may be input into the database 12 via the website 16 through pull down menus, as shown in FIG. 7. Team information may be entered into the website 16 or software application as well, such as player information, team schedule and opponents, and other team information.

Figure 8:
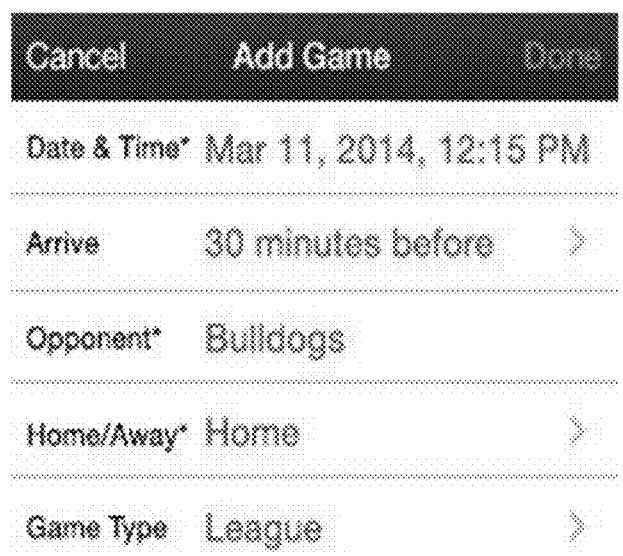
FIG. 8 illustrates game setup information input into the database.
Figure 9:
FIG. 9 illustrates setup information including a starting lineup.

Game setup information may be added for each game on a team's schedule through the website 16 or software application, as shown in FIG. 8. The setup information may include the team's opponent, the game location, the players on the team that are in the starting lineup (as shown in FIG. 9), a batting order (for baseball), each player's position, the number of innings in the game (for baseball), time limits for the halves, quarters, or periods of the game (for basketball, soccer, hockey, football, or other sports), and other appropriate setup information. The setup information may be stored on the database in association with a game as an event. The event and setup data may then be accessed by a remote device, such as a mobile device 12 with the software application or a computing device on the website 16. For example, a mobile device 12 with the software application may access a game that has been preset on the database 14 by a user. Changes to the setup information may be made on the mobile device 12 if necessary.

The scorekeeping software application may include dynamic adjusting capabilities. The dynamic adjusting capabilities, as further described below, allow the mobile device interface to adapt its display and its menu options to game situations.

In an embodiment, the scorekeeping software application may limit or specify menu options based on the game situation so that users can quickly and effectively chose the option that best fits the game situation. By way of example, in a baseball or softball mobile scorekeeping application: a "foul-tip out" will only be a menu option if there are two strikes on a batter, a wild pitch or passed ball will only be menu options for advancing a runner if a pitch has already been thrown to the next batter, a double play will only be a menu option for how a batter and runner got out if there are less than two outs in the inning. In each of these cases, a button or selection for the appropriate play will only appear as an input option for the user when that play is a possible outcome.

Figure 10:
FIG. 10 illustrates a portion of a sports venue on a software application.
Figure 11:
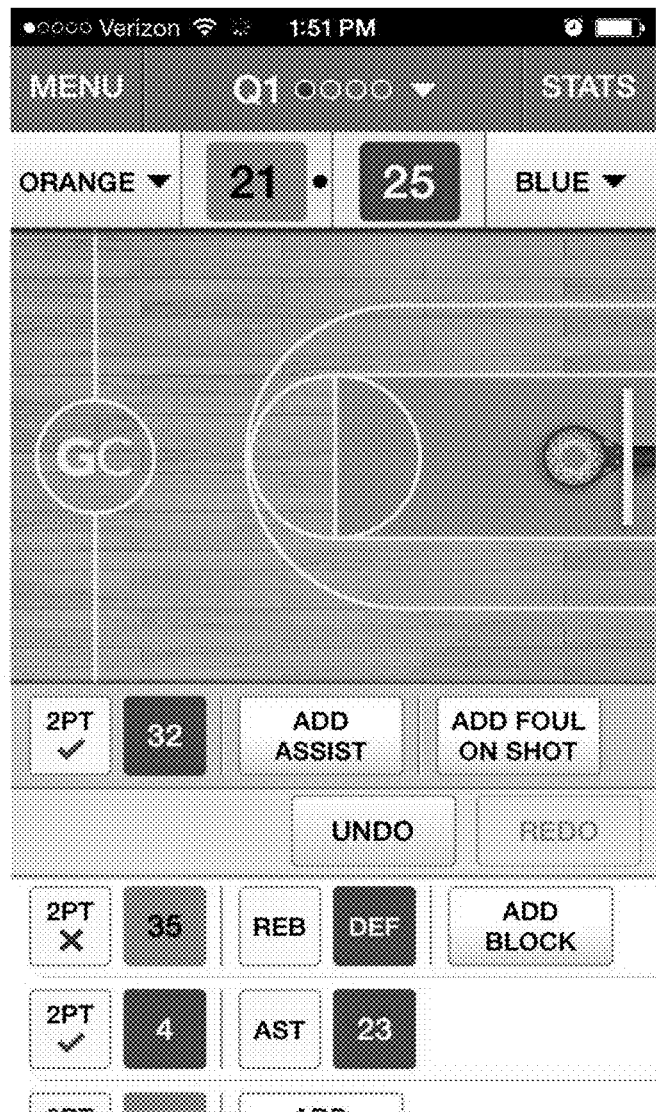
FIG. 11 illustrates a second portion of a sports venue on a software application.

The scorekeeping software application may further optimize or adjust the view of the playing field or court based on the game action. As described above, the software application may display at least a portion of a field, such as a baseball field, or a court, such as a basketball court or other sports field or court. In an embodiment, the software application may display only a portion of the field or court for scorekeeping purposes, excluding portions that are not necessary for that moment in the game, and may alter the view of the illustration of the venue based on scoring data input into the software. For example, a basketball scoring application may display a portion, such as 55%, of a basketball court, including the basket that the team with possession of the ball is shooting towards, as shown in FIG. 10. Once a user indicates that possession of the basketball has changed to the opposing team, the software application may then alter the display or slide the court in the display to show the opposite side of the basketball court, as shown in FIG. 11.

The graphical display may further be used to input information related to the game, including related to data that is location specific. For example, in a basketball scoring software application, the graphical display may be a graphical user interface that displays at least a portion of a basketball court and allows a user to indicate the location on a shot taken. In a baseball scoring software application, the graphical display may be a graphical user interface that displays at least a portion of a baseball field and allows a user to indicate the location a ball hit.

Figure 12:
FIG. 12 illustrates a list of game events in a software application.

The scorekeeping software may be configured to process each set of commands entered by a user or each play as an event, and store the event the database 14 associated with the appropriate game. Each event may flow through control structures in the software and causes appropriate interface changes, such as stat updates or display changes as described above. The scorekeeping software may allow a user to retroactively amend an event that was input into the software or to add additional information to or delete information from an event that has been recorded. For example, the software application may allow a play to be recorded by the application (such as a caught ball in baseball or a made shot or rebound in basketball), without recording the person or persons involved in the play. The user may then amend the information related to that event at any point after the play is recorded by opening a list of recorded events for the game, displayed on the mobile device 12, and assigning new information to that play or event, as shown in FIG. 12. The new information may include a player involved in the play, a stat added to the play, a correction to previously entered information, or adding or amending any other appropriate information. Once the editing of the play is complete, all stats associated with the edited play and involved player or players are updated. The software may further allow a user to access the listing of the events to edit the list order, delete events, undo or redo a specific editing command, or amend the events in any way.

Figure 13:
FIG. 13 illustrates a screen for entry of player information.
Figure 14:
FIG. 14 illustrates a screen for entry of player physical characteristics.

The software application may have the capability to allow a user to input and store metrics and data related to players on the teams. This type of data is often very useful for scouting purposes. The software application may allow a player to be selected to enter information related to the player, as shown in FIG. 13. Once a player is selected, the software application may display a plurality of fields and selections to allow the user to input information on the player. The fields and options may include information related to the player's physical size, athletic ability, skills and other appropriate metrics, as shown in FIG. 14.

Figure 15:
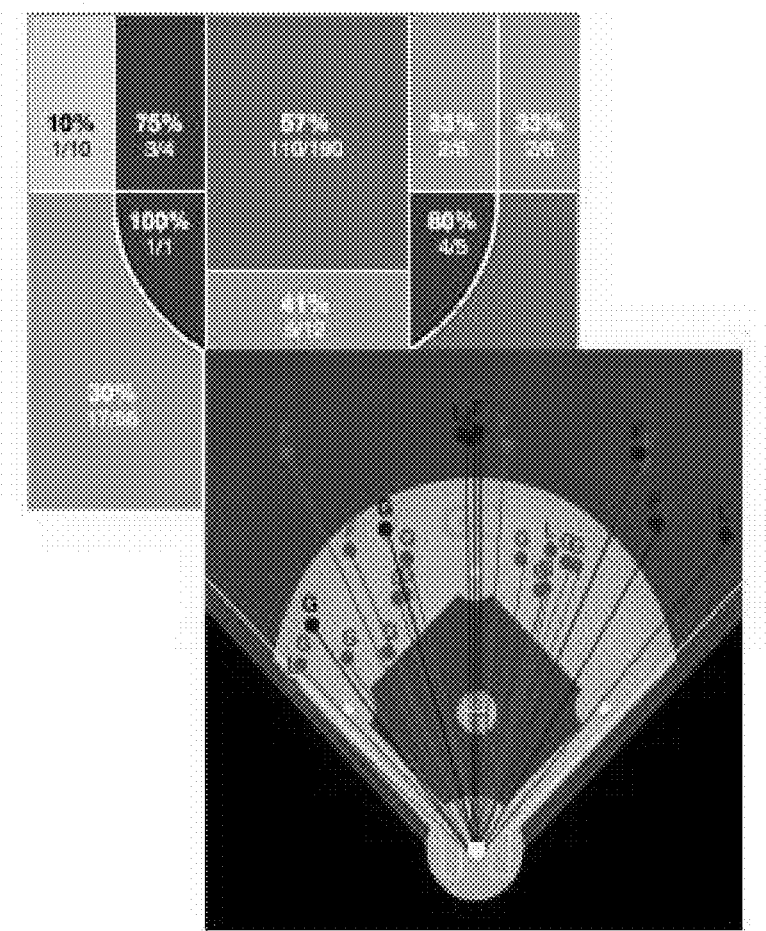
FIG. 15 illustrates a basketball shot chart and a baseball spray chart.

The software application may include a game streaming portion to allow a user to view live game data as it is input by another user on another device. As described above, the data input by the user on a mobile device 12 may be uploaded to the database 14, which may then allow the data to be accessed in real time by other mobile devices 12 using the software application to view live streaming data. The live streaming data may include graphics, such as shot charts (basketball) or spray charts (baseball) as shown in FIG. 15, play locations, illustrations of the field (such as a baseball field or basketball court), locations of plays on the field, and other graphical illustrations based on game data retrieved or streamed from the database 14. Users may further take pictures or video or other media and share them through the software application so that other users viewing the game can view the multimedia in real time. The pictures or videos may be tagged to a specific play or event within a game and shared with other users watching the live stream of the game. The live stream may be recorded by the app and replayed at a later time. The data may be stored on the device so that no network connection is required to view the replay.

Figure 16:
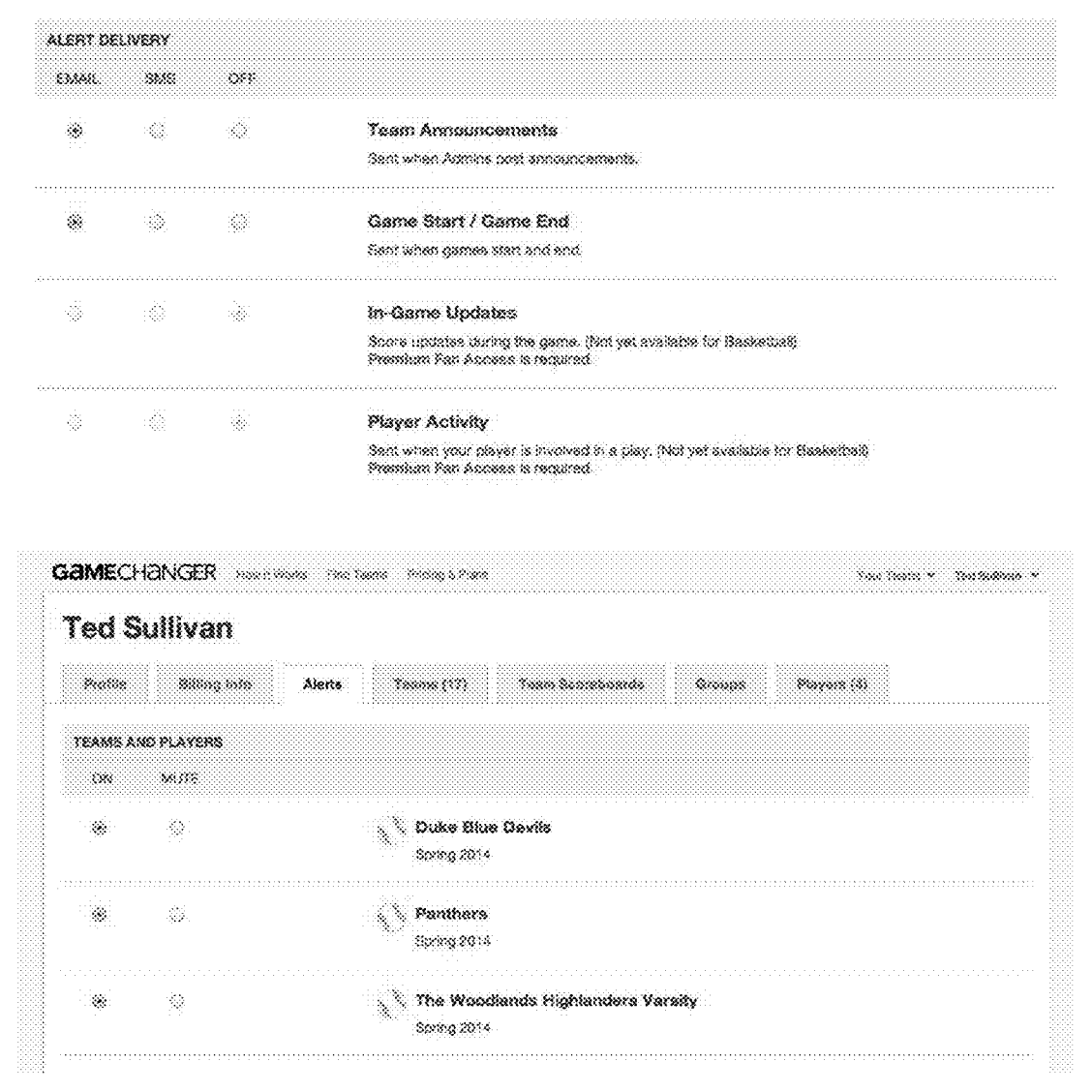

The software application may allow users to request game alerts for a given game. For example, as shown in FIG. 16, a user may configure alerts for desired games. The alert may include how the message will be delivered, such as via an SMS text, email, or any other appropriate delivery method. The user may have the option to mute the alert or turn it on. Users may also adjust the frequency of the alerts, such as at the end of the game, at the end of each quarter, inning, period or half. The software application may further include advertising space for advertisers banners. Advertisers may further purchase sponsored alerts that may be sent to users with appropriate alerts configured.

The invention has been described above and, obviously, modifications and alternations will occur to others upon a reading and understanding of this specification. The claims as follows are intended to include all modifications and alterations insofar as they come within the scope of the claims or the equivalent thereof.

Having thus described the invention, I claim:

1. A game scoring system comprising:
a first mobile electronic device capable of communication with a data network, said data network in communication with a database;
a software application running on said first mobile electronic device, said software application configured to receive user input associated with scoring and statistical data related to a sporting event and transmit said data to said database;
a graphical display configured to display at least a portion of a representation of a venue for said sporting event;
wherein said software is configured to:
receive said scoring and statistical data by way of a menu of options;
alter said display of said representation of said venue or said input options in said menu of options in response to said first mobile electronic device receiving said scoring or statistical data;
transmit said scoring and statistical data as it is received from said user input to said database, and wherein said database is configured to transmit said scoring and statistical data in response to receiving said scoring and statistical data to a second mobile device having a software application configured to receive and display said scoring and statistical data; and
receive a rating input from another user, said rating input associated with an accuracy of said scoring and statistical data, wherein the rating input is associate with a user identification associated with said first mobile electronic device.

2. The game scoring system of claim 1, wherein said venue for said sporting event includes a basketball court, and wherein said graphical display is configured to display a first portion of said basketball court comprising a first basketball hoop, but not including a second basketball hoop.

3. The game scoring system of claim 2, wherein said scoring or statistical data includes information related to a change of possession of said basketball.

4. The game scoring system of claim 1, wherein said graphical display is a graphical user interface configured to receive input information related to a location of a play relative to said venue.

5. The game scoring system of claim 1, wherein said software is configured to allow users to input voice or sound data into said first mobile device and upload said voice or sound data to said database.

6. The game scoring system of claim 1, wherein said software is configured to allow at least one of voice or speech recognition capabilities to receive and record game data input by said user's voice.

7. The game scoring system of claim 1, wherein said database is further configured to transmit said scoring and statistical data to said second mobile device in real-time.

8. The game scoring system of claim 1, wherein
said software application is further configured to receive imagery data of said sporting event and transmit said imagery data to said database in real-time.

9. A game scoring system comprising:
a first mobile electronic device capable of communication with a data network, said first mobile electronic device configured to:
receive user input regarding scoring and statistical data related to a sporting event;
initiate transmission of said scoring and statistical data to a database in communication with said first mobile electronic device;
wherein said game scoring system is configured to:
input game setup data into said database related to a sporting game; and
initiate transmission in real-time said scoring and statistical data to a second electronic mobile device configured to receive and display said scoring and statistical data in real-time, such that a user of said second mobile device may follow progress of said sporting event;
receive an accuracy rating of said scoring and statistical data from said second electronic mobile device, wherein said accuracy rating is associate with said first mobile electronic device;
access said game setup data and receive input scoring data related to said sporting game.

10. The game scoring system of claim 9, wherein said game setup data includes at least one of a game venue, a starting time, teams involved in said game, and a starting lineup.

11. The game scoring system of claim 9, wherein said game scoring system communicates with said database by way of a website.

12. The game scoring system of claim 9, wherein said game scoring system is further configured to instruct said second mobile device to render one or more graphic illustrations related to said scoring data.

13. The game scoring system of claim 9, wherein said software application is further configured to receive said scoring and statistical data corresponding to a play of said sporting event such that said second mobile electronic device may receive a play-by-play stream of said sporting event.

14. The game scoring system of claim 9, wherein said first mobile electronic device is further configured to:
   receive imagery data associated with said sporting event;
   determine a time period of the imagery data relative to the play-by-play data; and
   associated the imagery data with the time period of the play-by-play data, such that the imagery data may be accessed during playback of the play-by-play data,
   wherein the imagery data comprises at least one of a photograph or a video.

15. The game scoring system of claim 9, wherein said sporting event comprises at least one of a basketball game, a football game, a baseball game, a soccer match, or a hockey game.

16. A game scoring method comprising:
   receiving, by a first mobile electronic device, play-by-play data related to a sporting event;
   transmitting, by said first mobile device, a stream of said play-by-play data to said database in real-time;
   receiving, by said first mobile device, an accuracy rating of said scoring and statistical data, wherein said accuracy rating is associate with said first mobile electronic device;
   receiving, by said first mobile device, data related to metrics for analyzing players on a team in said sporting event; and
   transmitting, by said first mobile electronic device, to a database game information related to specific sporting events said game information comprises at least one of rules, regulations, or other information related to specific sports leagues such that said mobile electronic device is configured to upload rules, regulations and other information related to specific sports leagues.

17. The game scoring method of claim 16, wherein said data related to metrics for analyzing players includes data related to at least one of a player's size, dexterity, subjective athletic ability, or skills.

18. The game scoring method of claim 16, further comprising,
   determining, by said first mobile electronic device, how said play-by-play data may be entered by way of said menu options based at least in part on metadata and commands comprised by said at least one of rules, regulations, or other information.

19. The game scoring method of claim 16, further comprising:
   initiating transmission, to a second mobile electronic device, of said play-by-play data in response to said first mobile electronic device receiving said scoring and statistical data, wherein said second mobile electronic device is configured to receive and display said play-by-play.

20. The game scoring method of claim 16, wherein said database broadcasts, via said data network, said stream of said play-by-play data to said database in real-time.

* * * * *